March 31, 1931. W. L. POYNER 1,799,024
TIRE CARRIER
Filed Nov. 27, 1929
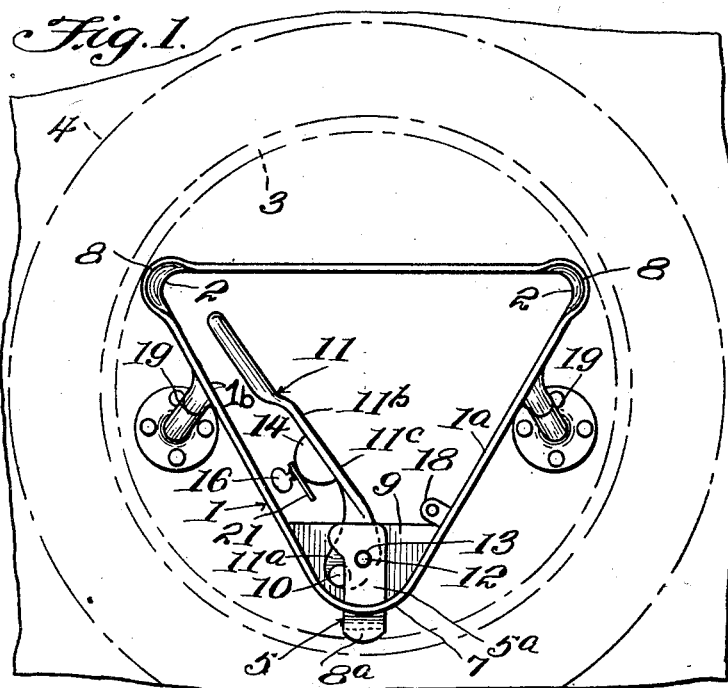
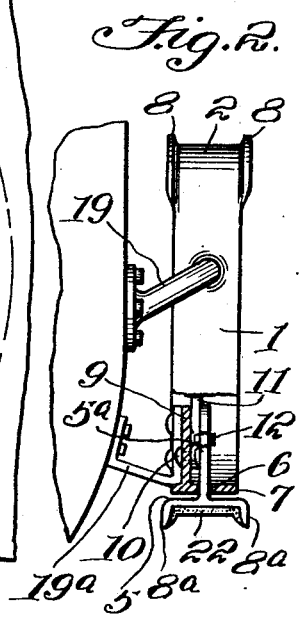
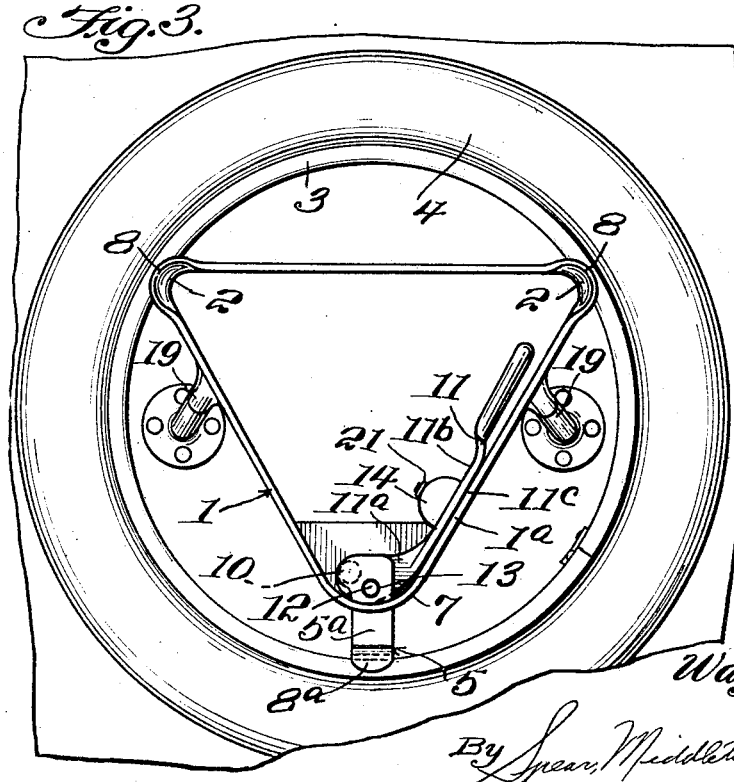
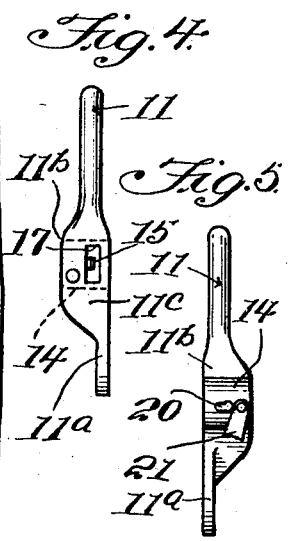
Inventor
Wayne L. Poyner
By Spear, Middleton, Donaldson & Hall
Attorneys Patented Mar. 31, 1931

1,799,024

UNITED STATES PATENT OFFICE

WAYNE L. POYNER, OF LUMBERTON, MISSISSIPPI

TIRE CARRIER

Application filed November 27, 1929. Serial No. 410,170.

My present invention relates to improvements in tire carriers or holders.

An object of the invention is the provision of an improved type of holder for attaching a spare tire to a vehicle.

A further object is to provide a holder of simple and sturdy construction which may be readily and inexpensively manufactured.

Another object of the invention is to provide a clamping yoke and lever structure which consists of few parts disposed to effectively and securely attach the spare tire to the holder.

Another object is to provide novel means for locking the holder in attached position, securely clamping a rim and tire thereto, from which the rim and tire can be released and removed without the aid or use of wrenches or other tools.

A still further object is to provide a structure affording substantial protection to the movable parts by partially enclosing the same so that projecting parts subject to breakage are reduced to a minimum.

Other objects will appear hereinafter.

The invention consists in the features, combination, and arrangement of parts hereinafter described and particularly pointed out in the claims.

In the drawings:

Figure 1 is a front or outside view of the carrier as secured to rear of the car with the lever in position with the yoke withdrawn.

Fig. 2 is a side view of the same.

Fig. 3 is a view of the carrier in holding position with the tire and rim thereon.

Fig. 4 is a detail view of the locking lever, showing the under side thereof.

Fig. 5 is a top view of the locking lever.

Referring to the drawings, 1 represents my improved tire carrier which is preferably in the form of a triangle although I do not desire to limit my invention to the exact shape shown. The tire carrier or holder 1 comprises a band in closed or general ring form and having corners 2 adapted to engage the rim 3 of a spare tire 4 mounted thereon. A yoke member 5 is mounted for sliding movement toward or away from said tire rack or carrier in an opening 6 provided in another corner 7 thereof.

In the triangular band embodiment shown, the corners 2 are preferably provided with flaring lugs 8 at the sides thereof adapted to snugly fit the rim 3 of the spare tire.

At the inside of the band at the corner 7, the band is provided with a flange or plate 9 to which is pivotally connected at 10 a yoke actuating lever 11.

The lever 11 has a short arm portion 11a at the end of which said pivot 10 is mounted and a longer arm portion 11b extending approximately at right angles to the short arm at the opposite end thereof. On the short arm 11a at a point spaced from the pivot 10 is a pivot pin 12 received in a pivot opening 13 in the upper end of the stem portion 5a of the yoke member 5. The long arm 11b extends about at right angles to a line extending along said short arm 11a and through both pivots 10 and 12.

The yoke member comprises the yoke 5 having lugs 8a at the sides thereof to engage the rim of the tire to be held, and having the stem portion 5a passing through slot or aperture 6 in the corner 7 of the carrier 1.

The long arm 11b of the lever 11 is preferably provided with a flat face 11c adapted to lie against and parallel to one side 1a of the carrier 1 as shown in Fig. 3. When in this position, the lever has swung about its pivot 10 and by reason of its connections at 12 to the yoke stem, has advanced the yoke to tire rim engaging position. Moving the lever in the opposite direction away from side 1a and toward side 1b as shown in Fig. 1 will withdraw the yoke.

Carried by the lever 11 is a key operated lock 14 including a bolt member 15 movable by the key 16 across a slot or opening 17 in the flat face of the lever. The slot 17 communicates with the interior of the lock 14 as shown in Fig. 4.

An apertured lug or ear 18 projects from the side 1a of the carrier and is adapted to pass through the opening 17 and into position to interlockingly receive the lock bolt 15, when the lever is swung to position against the side 1a to advance the yoke.

The tire carrier 1 may be secured to the rear or other part of a vehicle such as the running board, fender, or side of the car in any desired manner by any desired means.

I have shown in the drawings by way of illustration, an embodiment wherein the carrier is secured to the rear of a car by brackets 19 with the movable clamping yoke member 5 disposed at the bottom, whereby the tire and rim can be placed or hung upon corners 2 and the lever then manipulated to move the yoke member downwardly into holding position.

It will be understood that the invention is not limited to the exact mounting of the carrier as shown by way of illustration in the drawings and that this may be varied within the scope of the invention. Also, it will be apparent that many modifications may be made in the structure of the carrier itself without departing from the scope of the invention. Other forms of lock may be provided to hold the lever in advanced position, although the lock structure shown is preferred.

An additional supporting bracket 19a is preferably provided to add further rigidity and security of attachment of the carrier to the body of the vehicle.

The keyhole 20 is preferably provided with a swinging cover 21 to prevent dust or mud from entering and stopping up the keyhole.

The yoke 5 is preferably of such size at the inner end of its stem 5a that when the lever is in clamping position the pivot 10 will be covered by the stem 5a. The yoke 5 may be provided with a rubber pad 22 to cushion its engagement with the rim.

I claim:

1. A tire carrier comprising a triangular rim, two corners of which are adapted to engage the rim of a spare tire, an aperture through the triangular rim at the third corner, a yoke having a stem portion slidably mounted in said aperture for slidably moving the yoke toward or away from said triangular rim, a lever pivotally mounted to said triangular rim at the inside of said third corner, said lever being pivotally connected to the inner end of said yoke stem portion at a point spaced from its pivotal connection to the rim to impart said sliding movement to the yoke.

2. A tire carrier comprising a triangular band, two corners of which are adapted to engage the rim of a spare tire, an opening through the band at the third corner, a yoke member slidably mounted in said opening for movement toward or away from said band, a yoke actuating lever pivoted to said band, said yoke being pivoted to said lever at a point spaced from the pivot of said lever on the band, said corners and said yoke having rim-engaging lugs at the sides of the band.

3. A tire carrier according to claim 2 in which said lever is provided with a slot in the arm thereof, said band having a perforated ear projecting inwardly therefrom, said lever being adapted to be swung against said band with the ear passing through its slot, and means on said lever for cooperating with said apertured ear to lock said lever against the band with the yoke advanced to engage the tire rim.

4. Apparatus according to claim 2 in which said lever is movable against and substantially parallel to one side of said band to advance the yoke to tire rim-engaging position and is movable in the opposite direction to withdraw the yoke, and means for locking said lever in position against the band with the yoke advanced.

5. A tire carrier comprising a closed band having projecting corners adapted to engage the rim of a spare tire, a tire rim-engaging yoke member slidably mounted in said band at another corner for movement toward or away therefrom, a lever pivoted to said band and pivoted at a spaced point thereon to said yoke to actuate the yoke upon swinging said lever.

6. A tire carrier according to claim 5 in which said lever has a flat face adapted to be swung to engagement with one side of said band to advance the yoke, and means for locking said lever in said position, said means including an apertured ear on the band passing through a slot in the lever and a key operated member on said lever adapted to pass through the aperture of the ear.

7. A tire carrier according to claim 5 in which said lever has a flat face adapted to be swung to engagement with one side of the band to advance the yoke, said yoke having a rubber pad at its outer end, the inner end of said yoke being of such size as to overlie the pivotal connection of the lever to the band when the lever is in position to advance the yoke, means for locking the lever in said position including an apertured ear on the band passing through a slot in the lever and a key operated bolt member on said lever adapted to pass through the aperture of the ear, said lever having a keyhole therein provided with a swinging cover, said tire carrier being adapted to be secured to a vehicle.

In testimony whereof, I affix my signature.

WAYNE L. POYNER.